United States Patent [19]

Tatami

[11] 4,162,508

[45] Jul. 24, 1979

[54] SYNCHRONIZING SIGNAL GENERATOR FOR PAL-TV SIGNAL PROCESSING SYSTEM

[75] Inventor: Mitsushige Tatami, Yokohama, Japan

[73] Assignee: Sony Corporation, Tokyo, Japan

[21] Appl. No.: 904,938

[22] Filed: May 11, 1978

[30] Foreign Application Priority Data

May 18, 1977 [JP] Japan ................................. 52/57278

[51] Int. Cl.² .......................................... H04N 9/47
[52] U.S. Cl. .................................................. 358/18
[58] Field of Search ....................................... 358/17, 18

[56] References Cited

U.S. PATENT DOCUMENTS 3,877,066  4/1975  Gils et al. ................................ 358/18

Primary Examiner—Richard Murray
Attorney, Agent, or Firm—Lewis H. Eslinger; Alvin Sinderbrand

[57] ABSTRACT

A synchronizing signal generator for a PAL-TV (television) signal processing system has a pulse oscillator which produces a pulse with the frequency $n \cdot f_{sc}$ in which $f_{sc}$ is the frequency of a color subcarrier signal and n is an integer selected to satisfy the following relation:

$$n/m \cdot f_{sc} = 2K \cdot f_H + l_1/m \cdot f_H + l_2/m \cdot f_V$$

where K, m, $l_1$ and $l_2$ are respective integers, $f_H$ is the horizontal synchronizing frequency and $f_V$ is the vertical synchronizing frequency. A pulse subtracter removes a certain pulse from the output pulses derived from the pulse oscillator, and a frequency divider produces pulses with the horizontal synchronizing frequency $f_H$ and the vertical synchronizing frequency $f_V$ based upon the output from the pulse subtractor. A variable frequency oscillator has an oscillation center frequency several times the horizontal synchronizing frequency and applies its oscillation output to a synchronizing signal reforming circuit, and a phase comparator phase-compares the output signal from the frequency divider with an output from the synchronizing signal reforming circuit at the same frequency. The above pulse subtracter removes $l_1$ pulses from the output of the pulse oscillator in each horizontal period and $l_2$ pulses from the output of the pulse oscillator in each vertical period, the oscillation frequency of the variable frequency oscillator is controlled with the output from the phase comparator, and the synchronizing signal reforming circuit produces synchronizing signals from the output of the variable frequency oscillator.

7 Claims, 15 Drawing Figures

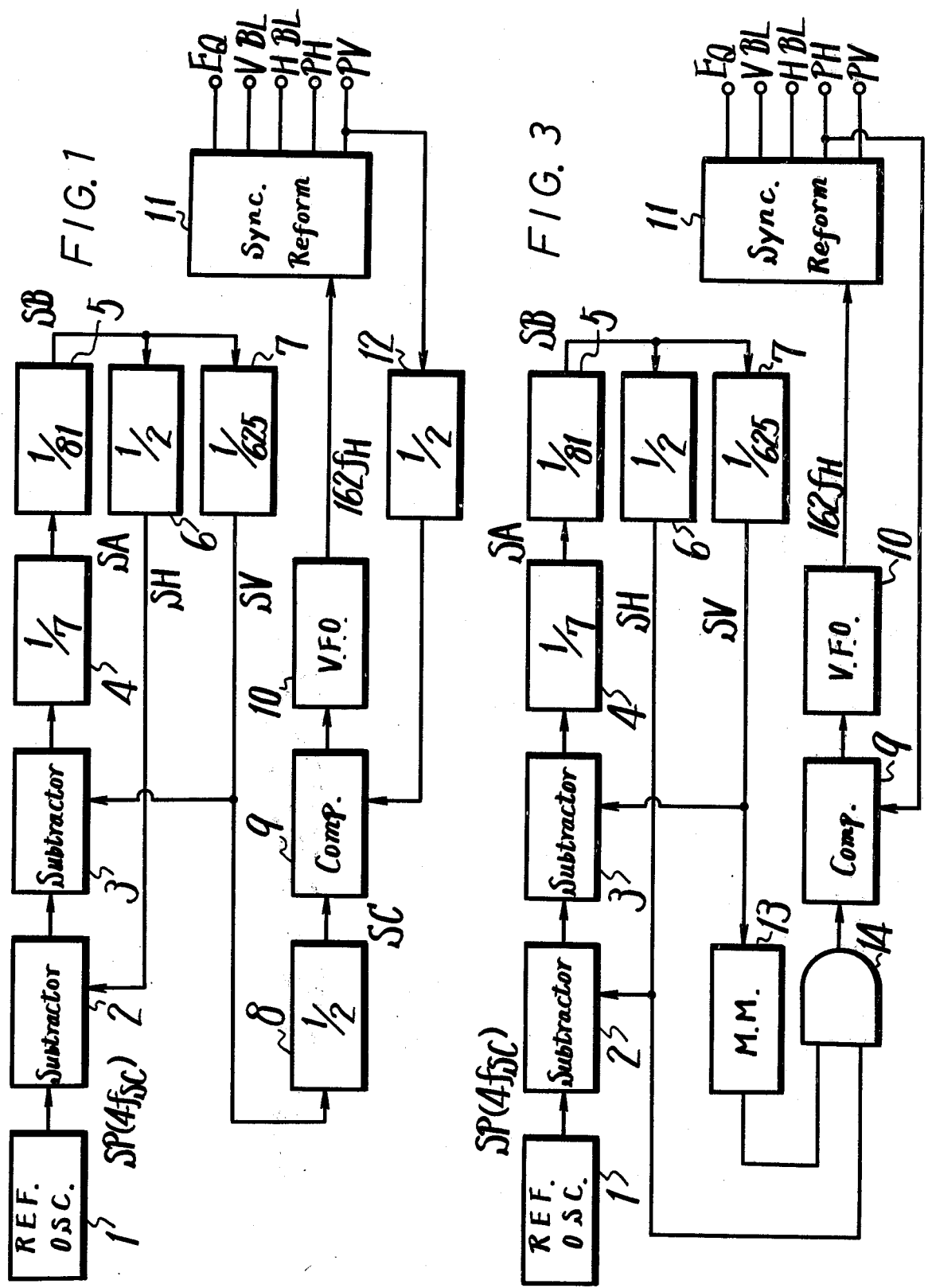

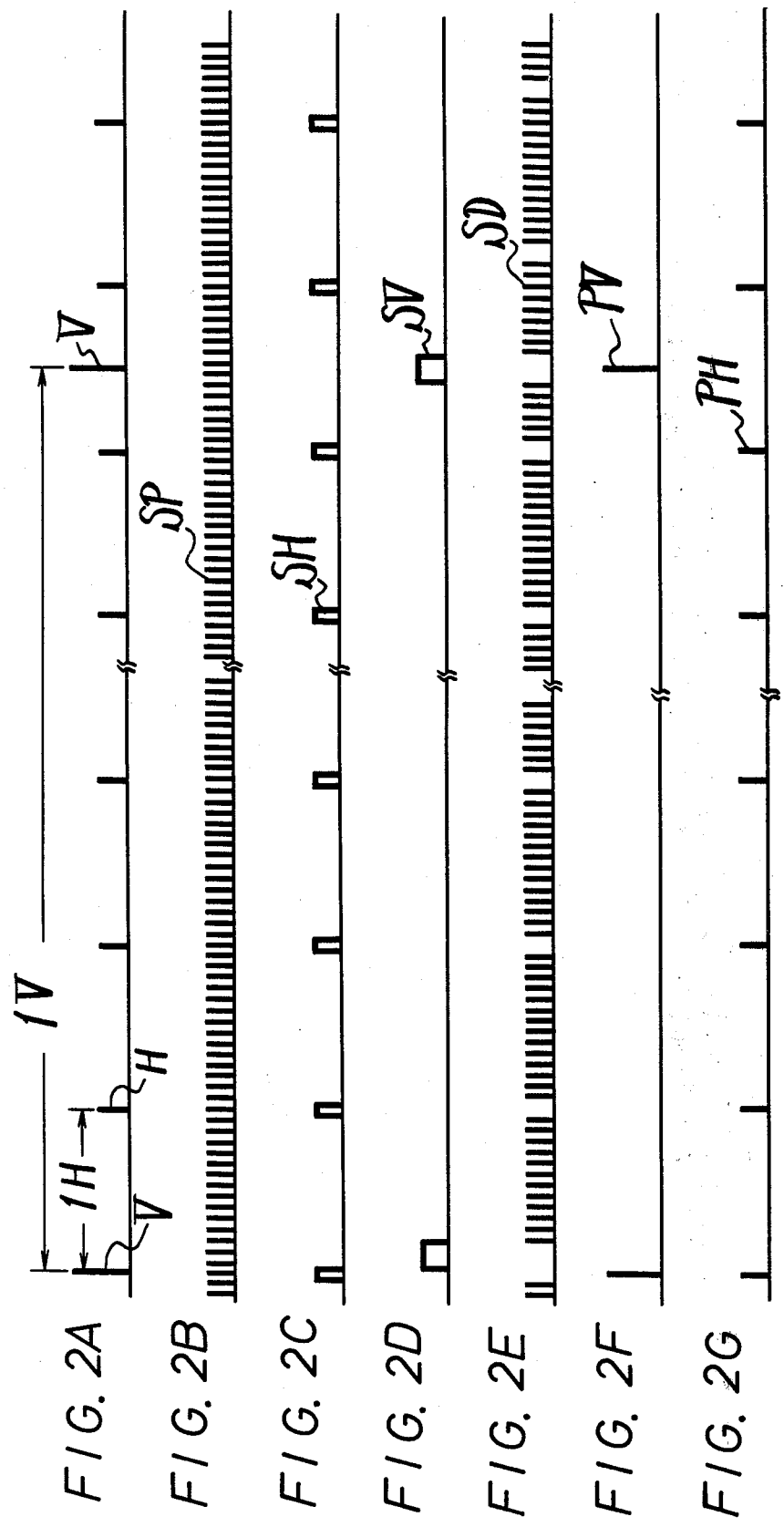

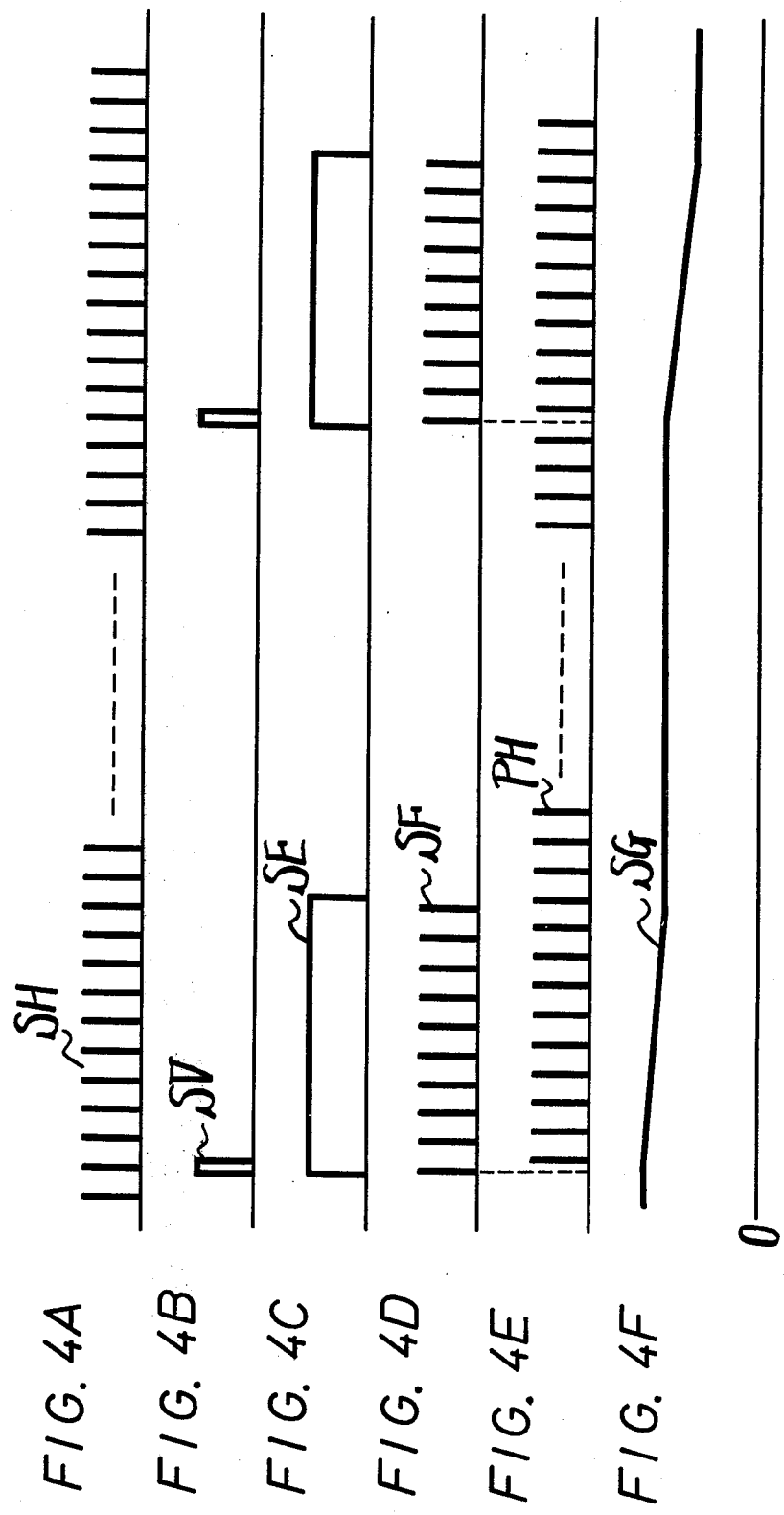

4,162,508

SYNCHRONIZING SIGNAL GENERATOR FOR PAL-TV SIGNAL PROCESSING SYSTEM

BACKGROUND OF THE INVENTION

1. Field of the Invention

This invention relates generally to a synchronizing signal generator and, more particularly, is directed to a synchronizing signal generator which can produce various synchronizing signals used in a PAL-TV signal processing system.

2. Description of the Prior Art

In the color television (TV) signal of the PAL system, there is established the following relation among the frequency $f_{sc}$ of the color subcarrier signal, the horizontal synchronizing frequency $f_H$ and the vertical synchronizing frequency $f_V (=2/625\, f_H)$:

$$f_{sc}=(284-\tfrac{1}{4})f_H+1/625\,f_H, \text{ or} \quad (1)$$

$$f_{sc}=1135/4\, f_H+\tfrac{1}{2}f_V \quad (2)$$

The above relation (1) is established between the frequencies $f_{sc}$, $f_H$ and $f_V$ so that, when the color subcarrier component is mixed into the luminance signal and bright and dark dots are produced on the screen of the picture tube, these dots are not conspicuous to a viewer.

By the way, if a reference oscillator with an oscillation frequency the same as the frequency $f_{sc}$ of the color subcarrier is provided and the oscillation output therefrom is frequency-divided, synchronizing signals having the above desired relation can not be obtained. More particularly, it is necessary that a signal of a frequency lower than the oscillation frequency $f_{sc}$ by $\tfrac{1}{2} f_V (=25\text{Hz})$ be provided and then frequency-divided. Such a synchronizing signal forming circuit can not be made only of digital circuits. However, if an oscillator with an oscillation frequency which is the least common multiple of the denominator of formula (1) above is used as the reference oscillator, both the color subcarrier and the horizontal synchronizing signals can be produced by merely frequency-dividing the oscillation output from such oscillator. In such case, however, the oscillation frequency of the reference oscillator must be selected to be 11 GHz which is very high and can not be realized by present techniques.

OBJECTS AND SUMMARY OF THE INVENTION

Accordingly, it is an object of the present invention to provide a novel synchronizing signal generator for a PAL-TV signal processing system.

Another object is to provide a synchronizing signal generator, as aforesaid, which can be formed as a digital circuit.

A further object of the invention is to provide a synchronizing signal generator for a PAL-TV signal processing system which can be formed as a digital circuit exclusively by digitally removing an offset for the horizontal synchronizing frequency and an offset for the vertical synchronizing frequency, and which is simple in construction and small in size.

It is a still further object of the invention to provide a synchronizing signal generator for a PAL-TV signal processing system in which the output frequency from a reference oscillator is selected to be several times the frequency of the color subcarrier, that the color subcarrier can be easily obtained by counting down the output from the reference oscillator.

It is still another object of the invention to provide a synchronizing signal generator whose output is suitable for use in a VTR (video tape recorder) for a video signal according to the PAL system, a TBC (time base corrector), a TV camera and so on.

According to an aspect of the present invention, a signal whose frequency is an integer times the horizontal synchronizing frequency $f_H$ or an even integer times the frequency $f_H$, if the equalizing pulse interval is taken into account, is obtained based on the color subcarrier frequency $f_{sc}$ so as to satisfy the above formula (2) modified as follows:

$$\text{synchronizing } f_{sc}=2K\cdot f_H+l_1/m\cdot f_H+l_2/m\cdot\tfrac{1}{2}f_V \quad (3)$$

where m, n, K, $l_1$ and $l_2$ are respective integers.

If both the sides of the formula (2) are multiplied by, for example, 4/7, the following formula (4) is obtained.

$$4/7\, f_{sc}=F_{sc}=162 f_H+1/7\, f_H+2/7\, f_V \quad (4)$$

Thus, it will be apparent from formula (2) that the signal with the frequency $F_{sc}$, which is obtained by multiplying the color subcarrier frequency $f_{sc}$ by 4/7, has an offset of 1/7 with respect to the horizontal synchronizing frequency and also an offset of 2/7 with respect to the vertical synchronizing frequency. This 1/7 offset is just one clock pulse of the signal with the frequency $4f_{sc}$ and the 2/7 offset is just two clock pulses of the same signal. Since the signal with the frequency $F_{sc}$ is obtained by counting down or dividing the signal $4f_{sc}$ by 7, a signal with the frequency $4f_{sc}$, which is fed to a counter as a frequency divider so as to produce the signal with the frequency $F_{sc}$, is delayed by one clock pulse for each horizontal period and is delayed by two clock pulses for each vertical period, with the result that the signal of frequency $F_{sc}$ from which the offsets are removed is obtained from the frequency divider.

In accordance with a feature of this invention, the signal having a frequency of an even multiple of the horizontal synchronizing frequency is produced from the signal of the frequency $F_{sc}$ and then a desired synchronizing signal is obtained from the thus produced signal.

The above, and other objects, features and advantages of the present invention, will become apparent from the following of illustrative embodiments to be read in conjunction with the accompanying drawings.

BRIEF DESCRIPTION OF THE DRAWINGS

FIG. 1 is a schematic block diagram showing a synchronizing signal generator according to an embodiment of the present invention;

FIGS. 2A to 2G are time charts to which reference will be made in explaining the operation of the embodiment of the invention shown in FIG. 1;

FIG. 3 is a schematic block diagram showing another embodiment of the invention; and FIGS. 4A to 4F are time charts to which reference will be made in explaining the operation of the embodiment of the invention shown in FIG. 3.

DESCRIPTION OF THE PREFERRED EMBODIMENTS

An embodiment of a synchronizing signal generator according to the present invention will now be described with reference to FIG. 1, in which a pulse oscillator serves as a reference oscillator 1. The reference oscillator 1 produces an output pulse SP having the frequency $4f_{sc}$, that is, four times the frequency of the color subcarrier, and which is fed through pulse eliminators or subtracters 2 and 3 to a 1/7 frequency divider 4. This 1/7 frequency divider 4 produces a signal SA having a frequency of $F_{SC}' \cong 4/7\ f_{SC}$.

The 1/7 offset for the horizontal synchronizing frequency corresponds to the output pulse SP of the frequency $4f_{SC}$ and accordingly to one clock pulse of the signal fed to the frequency divider 4, while the 2/7 offset for the vertical synchronizing frequency corresponds two clock pulses of the same signal. Thus, if one pulse is removed from the output pulse SP in the subtracter 2 for each horizontal period and two pulses are removed from the output pulse SP in the subtracter 3 for each vertical period, the offset components are apparently removed from the signal with the frequency $F_{SC}$. To this end, in the embodiment of FIG. 1, the output SA from frequency divider 4 is applied to a 1/81 frequency divider 5 to be counted down. Thus, the 1/81 frequency divider 5 produces an output SB with the frequency $2f_H$ which is then fed to a ½ frequency divider 6 in which the output SA is frequency-divided by 1/162. Therefore, the frequency divider 6 produces an output with the horizontal synchronizing frequency $f_H$ which is applied to subtracter 2 to remove one pulse from the output SP of reference oscillator 1, for example, in response to the going-up edge of the output of frequency divider 6. The output SB from frequency divider 5 is also fed to a 1/625 frequency divider 7 which then produces an output SV with the frequency of the vertical synchronizing frequency $f_V$. The output SV from frequency divider 7 is applied to subtracter 3 to remove two pulses from the output SP of reference oscillator 1, for example, in response to the going-up edge of the output SV.

Although it might be expected that the output from frequency divider 4 would have the offset components removed therefrom, there is a time in every two vertical periods when the pulse removing operation is carried out simultaneously in the subtracters 2 and 3. Accordingly, a signal SC having the frequency ½ $f_V$ and which is obtained by frequency-dividing the output SV of frequency $f_V$ from frequency divider 7 in a ½ frequency divider 8, is completely free from the offset.

The frequency divided signal SC from frequency divider 8 is used to provide a signal having the frequency 162 times the horizontal frequency $f_H$, and which is then used to produce the synchronizing signals. To this end, in the embodiment of FIG. 1, there is provided a variable frequency oscillator 10 having an oscillation center frequency selected to be 162 $f_H$. The output of oscillator 10 is fed to a synchronizing signal reforming circuit 11 which produces the horizontal and vertical synchronizing signals PH and PV. The vertical synchronizing signal PV from circuit 11 is fed to a ½ frequency divider 12 to be frequency-divided by ½. The frequency-divided output from divider 12 is fed to a comparator 9 which is also supplied with the offset-free signal SC from frequency divider 8 which has the frequency ½ $f_V$. The phase-compared output from phase comparator 9 is applied to the variable frequency oscillator 10 to control the oscillation frequency thereof. Therefore, the synchronizing signal reforming circuit 11 produces the synchronizing signals which satisfy the above formula (2). In the embodiment of FIG. 1, the comparator 9, variable frequency oscillator 10, synchronizing signal reforming circuit 11 and frequency divider 12 form a so-called phase locked loop.

FIGS. 2A to 2G are time charts showing the waveforms obtained at various parts of the circuit shown on FIG. 1. More particularly, FIG. 2A shows the horizontal and vertical synchronizing pulses H and V of the PAL-TV signal and FIG. 2B shows the output clock pulse SP from the reference oscillator 1. As described previously, the output clock pulse SP is selected to have the frequency $4\ f_{SC}$, with $4f_{SC} = 7F_{SC} = 1135f_H + 2f_V$, so that the horizontal synchronizing pulse H shown in FIG. 2A does not have the offset relation to the output clock pulse SP shown in FIG. 2B and one offset appears at every two fields between the vertical synchronizing pulse V and the clock pulse SP.

When the clock pulse SP shown in FIG. 2B is frequency-divided through the frequency dividers 4, 5, 6 and 7, the horizontal and vertical synchronizing pulse signals SH and SV shown on FIGS. 2C and 2D, respectively, are obtained from dividers 6 and 7. These pulse signals SH and SV are applied to the subtracters 2 and 3 to remove the offsets and hence the subtracters 2 and 3 produce the clock pulse SD free of offset as shown on FIG. 2E.

After the pulse signal SV from divider 7 is frequency-divided by frequency divider 8, the resulting signal SC and the output of divider 12 are applied to comparator 9 to control the variable frequency oscillator 10 which produces the signal with the frequency of $162f_H$. This signal is then fed from the variable frequency oscillator 10 to the synchronizing signal reforming circuit 11 which then produces the desired synchronizing signals PV and PH shown in FIGS. 2F and 2G, respectively. Since the synchronizing pulses SH and SV are produced by frequency-dividing the clock pulse $S_D$, they do not have a normal distance as do the output synchronizing pulses PH and PV, respectively.

FIG. 3 shows another embodiment of the present invention in which the so-called phase locked loop is made to have a more rapid response, and in which components corresponding to those described with reference to FIG. 1 are identified by the same reference numerals and their detailed description will be omitted for the sake of brevity.

In the embodiment of FIG. 3, the signal SV (FIG. 4B) having the vertical synchronizing frequency $f_V$ and delivered from frequency divider 7 is applied to a mono-stable multivibrator 13 to trigger the same by, for example, the going-up edge of the signal SV. When thus triggered, mono-stable multivibrator 13 produces a signal SE which, for example, is "1" during ten horizontal periods (FIG. 4C). This signal SE and the signal SH (FIG. 4A) having the horizontal synchronizing frequency $f_H$ from the frequency divider 6 are fed to an AND circuit 14 by which the signals SH of ten horizontal periods are delivered therefrom as an output SF (FIG. 4D). This output SF is fed to the phase comparator 9 which is also supplied with the horizontal synchronizing signal PH (FIG. 4E) from synchronizing signal reforming circuit 11, and comparator 9 effects the phase comparison of both the signals applied thereto. The phase-compared output SG (FIG. 4F) from the phase comparator 9 is applied to the variable frequency oscillator 10 to control its oscillation frequency.

In the embodiment of FIG. 3, the reference signal for phase comparator 9 is the signal SH from the frequency divider 6 and this signal SH includes in its phase a part of the 2/7 offset for the vertical synchronizing frequency. However, since the phase comparison is carried out in ten horizontal periods, and since the 2/7 offset corresponds to two periods of the frequency $4f_{SC}$ in one vertical period, the offset component can be expressed as follows:

$$2/4f_{SC}2/625 \times 10 = 3.6 \text{ n sec}_{p\text{-}p} = \pm 1.8 \text{ n sec}$$

Such an amount of offset is made to pose no problem by suitably selecting the values of the loop filter in the phase locked loop, the gain of the phase comparator 9 and so on.

Further, it is possible that various synchronizing pulses such as an equalizing pulse EQ, vertical blanking pulse VBL, horizontal blanking pulse HBL and so on can be developed from the synchronizing signal reforming circuit 11 in addition to the pulses PH and PV as shown on FIGS. 1 and 3.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. A synchronizing signal generator for a PAL-TV signal processing system comprising:

a pulse oscillator providing a pulse train with a frequency $n \cdot f_{sc}$ satisfying the following equation $$n/m \cdot f_{SC} = 2K \cdot f_H + l_1/M \cdot f_H + l_2/m \cdot f_V$$

in which $f_{SC}$, $f_H$ and $f_V$ are the color subcarrier frequency, the horizontal synchronizing frequency and the vertical synchronizing frequency, respectively, for the PAL-TV signal, and K, m, n, $l_1$ and $l_2$ are respective integers;

pulse subtracting means for subtracting $l_1$ pulses during each horizontal period and $l_2$ pulses during each vertical period from said pulse train;

frequency divider means receiving the output of said subtracting means and providing therefrom pulses with said horizontal and vertical synchronizing frequencies;

a variable frequency oscillator having a center frequency of $P \cdot f_H$ in which P is an integer;

a synchronizing signal reforming circuit driven by the oscillation output of said variable frequency oscillator and providing therefrom synchronizing output signals for the PAL-TV signal; and phase locked loop means for controlling said variable frequency oscillator in dependence on comparison of pulses from said frequency divider means with synchronizing output signals from said reforming circuit.

2. A synchronizing signal generator according to claim 1; in which said phase locked loop means includes a phase comparator, and input means for applying to said comparator said pulses with the vertical synchronizing frequency from said divider means and the synchronizing output signals with said vertical synchronizing frequency from said reforming circuit.

3. A synchronizing signal generator according to claim 2; in which said input means includes additional frequency divider means for dividing by 2 the frequencies of said pulses and said synchronizing output signals with said vertical synchronizing frequency.

4. A synchronizing signal generator according to claim 1; in which said phase locked loop means includes a phase comparator, and input means for applying to said comparator a predetermined number of said pulses with the horizontal synchronizing frequency during each vertical period and the synchronizing output signals with said horizontal synchronizing frequency from said reforming circuit.

5. A synchronizing signal generator according to claim 4; in which said input means includes a monostable-multivibrator triggered by each of said pulses with said vertical synchronizing frequency to provide an output of a duration corresponding to said predetermined number of said pulses with the horizontal synchronizing frequency, and an AND gate having a first input receiving said output of the multivibrator and a second output receiving said pulses with the horizontal synchronizing frequency to pass the latter to said comparator during said output from the multivibrator.

6. A synchrnizing signal generator according to claim 1; in which n is 4 and m is 7.

7. A synchronizing signal generator according to claim 6; in which K is 81, $l_1$ is 1 and $l_2$ is 2.

* * * * *